United States Patent [19]

Markley et al.

[11] 4,313,595
[45] Feb. 2, 1982

[54] MOUNTING BASE FOR MOTOR OPERATED VALVE

[76] Inventors: Myron D. Markley, 126 Winthrop Ter., Meriden, Conn. 06450; Joseph M. Markley, River Rd., Essex, Conn. 06426

[21] Appl. No.: 101,119

[22] Filed: Dec. 7, 1979

[51] Int. Cl.³ ............................................. F16M 1/00
[52] U.S. Cl. .................................. 251/369; 137/343; 248/674; 251/292
[58] Field of Search ............ 248/674, 678, 637; 251/291, 292, 128, 133, 369; 137/343

[56] References Cited

U.S. PATENT DOCUMENTS

| 833,143 | 10/1906 | Wolf | 251/291 X |
| 1,921,239 | 8/1933 | Miller | 248/674 |
| 4,139,016 | 2/1979 | Byrnes | 251/291 X |

FOREIGN PATENT DOCUMENTS 45-23267 7/1970 Japan ................................ 251/369

Primary Examiner—Wayne L. Shedd
Attorney, Agent, or Firm—Fishman and Van Kirk

[57] ABSTRACT

A mounting base is presented for an operating motor for a valve. The mounting base has split locking clamps which mount over the valve stem and are locked in place by clamping bolts.

6 Claims, 5 Drawing Figures 4,313,595

MOUNTING BASE FOR MOTOR OPERATED VALVE

BACKGROUND OF THE INVENTION

This invention relates to the field of motor operated valves. More particularly, this invention relates to a mounting base for mounting an operating motor in position to actuate a valve.

Motor operated valves have been known in the art for many years. These valve motors may be powered from a variety of sources, such as, for example, electrical power or pneumatic power. In all cases it is, of course, necessary to mount the motor in relation to the valve to be operated so that the motor can engage the valve and operate it.

Several mounting arrangements have been known in the prior art. One typical prior art arrangement has involved the use of U bolts around the body of the valve or the pipe in which the valve is located. The U bolts engage a plate which is positioned on top of the valve with a hole in the plate for the valve stem to pass through. The motor is mounted on the plate and engages the valve stem. This typical prior art configuration has serious alignment problems. It is extremely difficult to keep the motor aligned with the valve stem. This configuration is very susceptible to any influences, such as vibrations or pressure pulses, which might disturb the alignment between the motor and the valve stem. Such misalignment between the motor and the valve stem results, of course, in improper action, wearing of parts, or even binding to prevent operation of the valve.

Another known prior art configuration has mounting yokes located at each end of the valve housing with a mounting plate between the yokes. This arrangement (available from Worcester Controls, West Boylston, Mass.) does not have alignment problems. However, it does present serious drawbacks in that it requires a special three piece valve housing with mounting segments at each end of the main body of the valve housing on which to mount the yokes. That arrangement is not only expensive, but also is extremely limited in its utility because it can only be used with special three piece valve housings and is not suitable for use with motor operated valves in general.

SUMMARY OF THE INVENTION

The motor mounting base of the present invention overcomes or alleviates many of the problems of the prior art. The mounting base of the present invention has a motor mounting plate (to which the motor is to be attached) and an integral mounting bracket extending from the plate. The mounting bracket has a central circular opening from which extend flexing slots which serve to divide the bracket to form two flexible gripping elements in the bracket. The valve stem housing is ground to mate with the central opening in the bracket, and the bracket is positioned on the valve stem housing. Locking bolts extend through the bracket in the vicinity of the flexing slots to flex the bracket segments and lock the bracket tightly onto the housing of the valve stem.

The mounting base of the present invention completely eliminates any problems of alignment between the valve and the motor. Furthermore, the mounting base of the present invention is adaptable for use on almost any motor operated valve, and it is inexpensive and reliable.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 3:
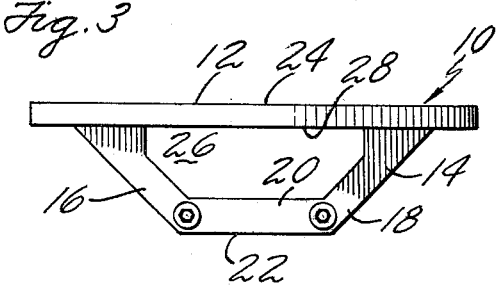
FIG. 3 is a side elevation view of the mounting base of the present invention.
Figure 5:
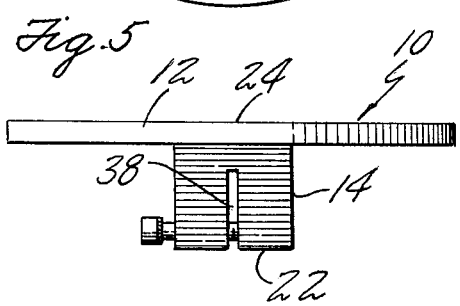
FIG 5 is a front elevation view of the mounting base (i.e., a view of FIG. 3 turned 90 degrees counterclockwise).

Referring to the several FIGURES of the drawings, the mounting base indicated generally at 10 has a circular plate 12 from which extends an integral bracket 14. Mounting base 10 may be made from any suitable material, the preferred embodiment being an aluminum casting. Bracket 14 consists of a pair of legs or branches 16 and 18 which depend from plate 12 and are inclined toward each other. Legs 18 terminate in a flat bridging segment 20 which extends between the legs and has a lower surface 22 parallel to the upper surface 24 of plate 12. As can best be seen in FIGS. 1 and 3, the bracket 14 is in the form of an inverted skeletal arch which defines an open chamber 26 between the bracket and the lower surface 28 of plate 12.

Figure 1:
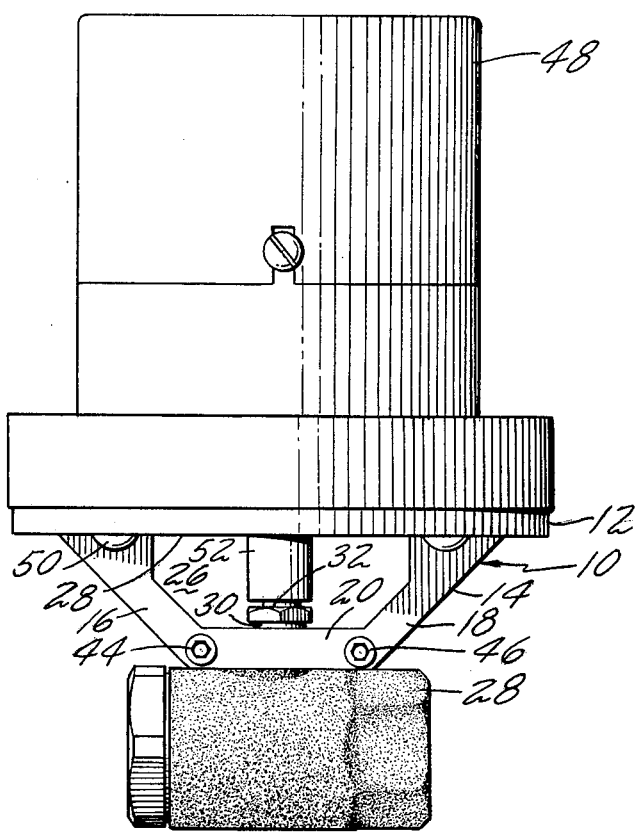
FIG. 1 is an elevation view of the motor mounting base of the present invention in position on a valve housing and with the operating motor in place.
Figure 2:
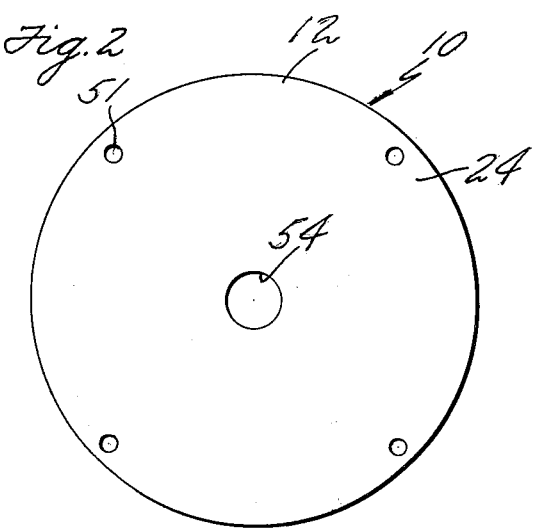
FIG. 2 is a top plan view of the mounting base of the present invention.
Figure 4:
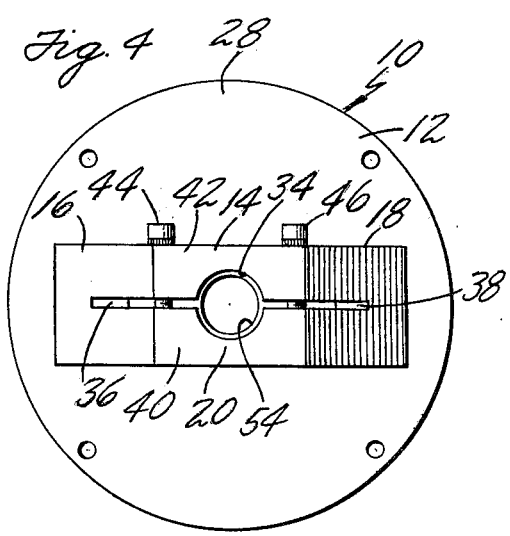
FIG. 4 is a bottom plan view of the mounting base of the present invention (i.e., a view seen by turning over the device as shown in FIG. 2)

As can be seen in FIG. 1, mounting base 10 is mounted on the housing 28 of the valve (not shown) which is to be actuated. Valve stem housing 30 projects from the top of the valve housing, and the valve stem 32 passes from the valve interior through valve stem housing 30 to project out of the valve stem housing. Bracket 14 is mounted on valve stem housing 30 by a central circular passageway 34 which extends through bridge segment 20. To mount the bracket on the valve stem housing, the exterior surface of the valve stem housing should first be machined to form a cylindrical surface having an outer diameter just slightly smaller than the diameter of passage 34. The bracket is then mounted on the valve stem housing by placing passage 34 over the valve stem housing so that valve stem 32 projects into chamber 26.

In order to secure the bracket to the valve housing, a pair of essentially identical elongated slots 36 and 38 extend from diametrically opposite parts of passage 34 along the entire length and depth of bridge segment 20 and along a portion of legs 16 and 18. The slots 36 and 38 and central opening 34 serve, in effect, to split the lower part of the bracket, particularly bridging segment 20, into a pair of flexible gripping elements or segments 40 and 42. Slots 36 and 38 extend completely through bridge 20 to divide the bridge into a pair of elements of limited flexibility attached to legs 14 and 16. That is, the central opening 34 and the radiating slots 36 and 38 permit the segments 40 and 42 to flex under an appropriate load. The load to effect flexing is imposed by a pair of clamping bolts 44 and 46 which pass through flex segment 42 and are threaded into flex segment 40. The heads of bolts 44 and 46 are shown bearing against the outer surface of flex segment 42; however, it will be understood that those bolt heads may also be countersunk within the recesses in the body of flex segment 42. By turning the bolts 44 and 46 in the direction to tighten the bolts, the segments 40 and 42 of bridge 20 are pinched or drawn toward each other to narrow the slots 36 and 38 narrow the diameter of opening 34 to bring the walls of opening 34 into firm gripping and locking engagement with valve stem housing 30. As will be understood by those skilled in the art, this flexing and gripping action results in an extremely strong locking load whereby mounting base 10 is firmly secured to the valve housing.

A valve operating motor 48 is mounted on the upper surface 24 of plate 12. Valve motor 48 may be any desired motor known in the art, and it may be mounted by means of any convenient mechanism such as bolts 50 which pass through holes 51 to engage the motor housing. A motor output shaft or valve actuating element 52 extends from the interior of motor 48 and passes through an opening 54 in plate 12 into chamber 26 to operatively engage valve stem 32 so that the valve will be operated (i.e., turned) when motor 48 is actuated.

As can be seen from the foregoing description and the drawings, the mounting base of the present invention is a relatively simple mechanism, but one which has the substantial advantage of assuring constant and accurate alignment of the motor and its actuating element 52 with the valve stem 32 of the valve to be actuated. This constancy and accuracy of alignment is achieved because of the parallel relationship between bridge 20 and plate 12 whereby plate 12 sits along the valve housing; and this constancy and accuracy of alignment is assured by the firm gripping of the valve stem housing by flexible gripping segments 40 and 42 of the bridge. By virtue of this construction, the mounting base simply has no freedom of movement to move or tilt and destroy the alignment between motor output shaft 52 and the valve stem 32 of the valve to be operated.

Another advantage of the mounting base of the present invention is that it provides an extremely simple and convenient way to manually operate the valve in the event of a power failure. If a power failure should occur, one needs only to loosen the clamping bolts 44 and 46 sufficiently to permit rotation of mounting base 10 relative to the valve housing. Then, 90 degree rotation of the bracket relative to the valve housing in one direction or the other will serve to actuate the valve from either the closed position to the open position or vice versa depending on the initial state of the valve.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A mounting base for a motor operated valve, the base including:
   a plate having first and second sides, said first side being adapted to mount a motor;
   a mounting bracket on said second side of said plate, said mounting bracket having first and second branches extending from said second side and a bridging segment between said branches, said bridging segment being spaced from said second side of said plate and having an outer surface in predetermined alignment with said first side of said plate;
   a passage in said bridging element to receive a valve stem housing;
   a pair of slots in said bracket, said slots extending from said passage in opposite directions along the length of said bridging element, said slots extending through said bridging element and into said first and second branches to divide said bridge into first and second gripping elements; and
   means to urge said first and second gripping elements toward each other to lock said mounting base on a valve housing.

2. A mounting base as in claim 1 wherein said first and second branches of said mounting bracket are inclined toward each other.

3. A mounting base as in claim 1 wherein:
said passage in said bridge is central thereof; and
said slots are essentially identical slots radiating from diametrically opposite parts of said passage.

4. A mounting base as in claim 1 wherein:
said first and second branches and said bridge form an arch and define a chamber between said bridge and said plate.

5. A mounting base as in claim 1 wherein said urging means is a pair of bolts extending through one of said gripping elements into the other of said gripping elements.

6. A mounting base as in claim 1 wherein:
said outer surface of said bridge is parallel to said first side of said plate.

* * * * *